United States Patent

Smith et al.

[15] 3,652,210

[45] Mar. 28, 1972

[54] DEARSENICATION OF PHOSPHATE ROCK

[72] Inventors: Raymond Anthony Smith, Walsall; John Norman Sansom, Birmingham, both of England

[73] Assignee: Electric Reduction Company of Canada Limited, Islington, Ontario, Canada

[22] Filed: July 3, 1969

[21] Appl. No.: 839,043

[30] Foreign Application Priority Data

July 11, 1968  Great Britain......................33,065/68

[52] U.S. Cl..........................................23/165, 23/223, 75/6
[51] Int. Cl.................C01b 25/00, C01b 25/02, C01b 25/12
[58] Field of Search................23/165, 165 A, 223, 108, 109; 75/6

[56] References Cited

UNITED STATES PATENTS

| 1,994,070 | 3/1935 | Foss............................................71/7 |
| 2,289,538 | 7/1942 | Buford......................................23/223 |
| 3,207,580 | 9/1965 | Cosway et al............................23/165 |

FOREIGN PATENTS OR APPLICATIONS 20,521  2/1892  Great Britain.........................75/6

Primary Examiner—Earl C. Thomas
Assistant Examiner—Gregory A. Heller
Attorney—Herbert E. Goodman

[57] ABSTRACT

Elemental phosphorus suitable for conversion in $P_2O_5$ for use in foodstuffs as a result of its low arsenic content, is obtained via the electrothermal route from phosphate rock which has previously been mixed with sufficient phosphoric acid to reduce the CaO to $P_2O_5$ ratio to below 3 : 1 and then calcined at at least 1,000° C.

12 Claims, No Drawings

DEARSENICATION OF PHOSPHATE ROCK

The present invention relates to the production of phosphorus having a low arsenic content which is suitable for conversion into phosphoric acid for use in food.

Hitherto the commercial methods used to remove arsenic from phosphoric acid have involved either of two techniques, treatment of the acid with gaseous hydrogen sulphide to precipitate arsenic sulphides which are subsequently filtered off or passing gaseous hydrogen chloride through the acid to remove arsenic as arsenic chloride. Both techniques have several disadvantages such as the need to dilute the acid to about 1.75 g./cc. specific gravity in order to optimise the arsenic removal and subsequent elimination of the added gas. Furthermore the acids are extremely corrosive and this causes severe attack on the dearsenifier units. The dilution of the acid to 1.75 S.G. destroys polyphosphates present and increases the amount of water which has to be removed from the system if the acid is subsequently neutralised with alkali and then converted by calcination to a polyphosphate.

We have now found that phosphoric acid made from phosphorus produced by the electrothermal process from phosphate rock which has been pre-treated before being fed into the electrothermal furnace has a substantially reduced arsenic content as compared with that produced from rock which has not undergone such a pretreatment.

According to the present invention there is provided a process for the production of phosphorus which comprises adding to phosphate rock sufficient phosphoric acid to bring the $CaO : P_2O_5$ ratio to less than 3 : 1 calcining the resulting mixture at a temperature in excess of 1,000° C. and subsequently extracting phosphorus from the treated rock by a known electrothermal process. Methods similar to this pre-treatment of phosphate rock have been proposed per se for the purpose of defluorinating the rock. However, rock which is to be employed in the electrothermal process for conversion to phosphorus is not defluorinated since the conditions employed in the electrothermal process themselves will result in the substantial removal of fluorine from the product phosphorus. Defluorinated rock is normally used without subsequent treatment in fertilizers or in animal feed supplements.

It is customary to pelletise phosphate rock before feeding it into an electrothermal furnace for the extraction of phosphorus and in the process of the invention such pelletisation may conveniently be carried out prior to the calcination stage. This may be accomplished either by agglomerating ground rock with water prior to the addition of the phosphoric acid or by employing phosphoric acid of appropriate dilution so the acid itself will act as a binder for the pellets. Alternatively, the rock may be mixed with the appropriate amount of acid in a mechanical mixer and then granulated by extrusion in the usual manner.

The phosphoric acid employed in the process of the invention to adjust the CaO to $P_2O_5$ ratio may advantageously be that obtained by the so called wet process from the reaction of phosphate rock with a mineral acid. If desired, however, acid obtained by the thermal process, that is burning phosphorus in air to obtain $P_2O_5$ and the disolving it in water, may be employed. We have found that acids having a concentration of up to 100% $H_3PO_4$ are suitable for the process of the invention. There is no lower limit of concentration. Normal commercial acids such as wet process acids of about 32 or 54% $P_2O_5$ or thermal acids of concentrations of 28, 43 and 65% $P_2O_5$ are all of use. The phosphoric acid will be employed in sufficient amount to bring the CaO : $P_2O_5$ ratio to less than 3 : 1. We have found that a CaO : $P_2O_5$ ratio of below 2.80 : 1, and in particular of about 2.75 : 1, to be particularly useful. The amount of phosphoric acid employed should not, however, be sufficient to cause the rock to fuse on calcination.

The calcination is carried out at a temperature in excess of 1,000° C., preferably in the range of 1,200° to 1,300° C. We have found it desirable to carry out the calcination in the presence of steam: preferably at a partial pressure of 300 to 500 mm. of mercury. This may be introduced in any convenient manner for example by using phosphoric acid of a suitable dilution or by spraying water directly into the calciner. It is often desirable to carry out the calcination in a calciner which imparts some relative motion to the particles. A rotary calciner is particularly suitable for this although other forms of calciner such as a fluidised bed or a static calciner may be used if so desired.

Phosphate rock which has been so treated is converted to phosphorus in the way conventionally used for phosphate rock. This involves admixing the rock with carbon, often in the form of coke, and silica in a furnace and passing a heating electrical current through the mixture commonly using carbon electrodues. Processes of this type are described in detail in "Phosphorus and its Compounds" by J.R. Van Wazer in volume 2 at pages 1,160 to 1,197.

Phosphorus leaves the furnace in the form of a gas and dust contained in this is normally separated in a precipitator and the phosphorus then condensed by passing into a chamber into which water is sprayed.

Phosphorus so produced is suitable for burning in air or oxygen to yield $P_2O_5$ which can be converted by dissolution in water to phosphoric acid which is suitable for use in food manufacture.

For example phosphoric acid so produced might be converted to its acid sodium or calcium salts for use in powders used to cause leavening in the baking industry or to polyphosphates for use in improving the quality of frozen poultry or fish or in dairy produce such as ice cream or synthetic creams. Alternatively, $P_2O_5$ so produced may itself be employed in the production of ingredients for foodstuffs. For example it may be reacted with diglycerides to produce lecithin-type materials. Further examples of the use of phosphoric acid, $P_2O_5$ and phosphates in the production of foods for human consumption are given in chapter 25 of Wan Wazer's book previously referred to.

If the rock originally used has a particularly high arsenic content it may be desirable to carry out a conventional dearsenification prior to using the product in food. If this is done, however, considerably less arsenic will need to be precipitated than previously and consequently the exposure of the apparatus to corrosive chemicals may be considerably reduced as compared to that required if no pre-treatment is employed.

The removal of arsenic from phosphate rock according to the process of the invention is illustrated by weight unless otherwise stated.

EXAMPLES

In each of the examples 20 parts of Florida phosphate rock (having an arsenic content of 21 p.p.m. and a $P_2O_5$ content of 31.2) was ground to a particle size of between 100 and 200 mesh and mixed with thermal phosphoric acid. The amount and concentration of acid used in each case being shown on Table 1. This mixture was allowed to dry and the dried mixes were reground. The reground mixes were then heated in a furnace for 40–45 minutes at the temperature shown in Table 1. Steam was passed into the furnace during the heating to produce a partial water vapour pressure in the range 300 to 500 mm. of mercury.

The arsenic content of the treated rock was determined by a method in which the arsenic is reduced to arsine, by the action of zinc and hydrochloric acid in the presence of stannous chloride, which is absorbed in a solution of silver diethyldithiocarbamate in pyridine. This produces a red complex which is measured spectrophotometrically. The arsenic content of rock after treatment is shown on Table 1.

The rocks so treated were then converted to phosphorus by admixing them with coke and silica in a weight ratio of about 100 : 15 : 5 and heating the mixture by passing an electric current through it. The gasses given off were passed through an electrostatic precipitation and the phosphorus vapour condensed by passing it into a chamber into which water was sprayed.

TABLE 1

| P$_2$O$_5$ added (as acid) gm./100 gm. rock | Strength of acid, percent P$_2$O$_5$ w./w. | CaO/P$_2$O$_5$ molar ratio | Residual arsenic (as p.p.m. of As) after calcining at— | | | | | |
|---|---|---|---|---|---|---|---|---|
| | | | 800° C. | 900° C. | 1,000° C. | 1,100° C. | 1,200° C. | 1,300° C. |
| 0 | | 3.68 | 20 | | | 21 | 22 | 18 |
| 3.5 | 28 | 3.30 | 16 | 15 | 12 | 16 | 17 | 6.3 |
| 7.35 | 28 | 2.97 | 17 | 12 | 11 | 6.3 | 3.3 | 2.1 |
| 10.5 | 28 | 2.75 | | | | 3.9 | 1.5 | 0.3 |
| 14.0 | 28 | 2.54 | | | | 1.1 | 0.8 | 1.9 |
| | 48 | | | | | 1.1–1.6 | 3.9–2.1 | 2.3 |
| 21.0 | 65.5 | 2.33 | 15 | 13 | 7 | 2.7 | 1.7 | 2.7 |
| | 43 | | | | | 1.1 | 0.2 | 0.3 |
| | 43 | | | | | 0.8 | 0.4 | 1.1 |
| 28.0 | 65.5 | 1.92 | 14 | 7 | 5 | 1.1–1.0 | 1.1–0.8 | 1.9–1.5 |

We claim:

1. In the electrothermal process for production of high purity phosphorus from arsenic-containing phosphate rock feed wherein said phosphate rock is admixed with carbon and silica in an electrothermal furnace and an electric current is passed through the mixture to reduce phosphorus and the said reduced phosphorus is then recovered, the improvement which comprises removing the arsenic from said arsenic-containing phosphate rock feed prior to passing said phosphate rock into the electrothermal furnace, by admixing said arsenic-containing phosphate rock with sufficient phosphoric acid to bring the CaO : P$_2$O$_5$ ratio of the mixture to less than 3 : 1 and calcining said arsenic-containing phosphate rock and phosphoric acid mixture at a temperature in excess of 1,000° C. for a time sufficient to substantially remove the arsenic in said phosphate rock and phosphoric acid mixture and then using said phosphate rock and phosphoric acid mixture from which arsenic has been removed as the said phosphate rock feed to said electrothermal furnace.

2. The process of claim 1 wherein said calcining is at a temperature between 1,000° and 1,300° C.

3. A process as claimed in claim 1 wherein the amount of phosphoric acid added is sufficient to bring the CaO : P$_2$O$_5$ ratio of the mixture to less than 2.80 : 1.

4. A process as claimed in claim 3 wherein the amount of phosphoric acid added is sufficient to bring the CaO : P$_2$O$_5$ ratio of the mixture to about 2.75 : 1.

5. A process as claimed in claim 1 wherein the calcination is carried out at a temperature in the range 1,200° to 1,300° C.

6. A process as claimed in claim 1 wherein the calcination is carried out in the presence of water vapour at a partial pressure of 300 to 500 mm. of mercury.

7. A process for the production of phosphorus pentoxide wherein phosphorus obtained by the process claimed in claim 1 is burnt in air or oxygen.

8. The process of claim 7 wherein the amount of phosphoric acid admixed with said arsenic-containing phosphate rock is sufficient to bring the CaO : P$_2$O$_5$ ratio of the mixture to less than 2.80 : 1.

9. The process of claim 8 wherein said calcination is carried out at a temperature in the range of 1,200° to 1,300° C.

10. The process of claim 9 wherein said calcination is carried out in the presence of water vapor at a partial pressure of 300 to 500 mm. of mercury.

11. The process of claim 10 wherein the amount of phosphoric acid is sufficient to bring the CaO : P$_2$O$_5$ of the mixture to about 2.75 : 1.

12. The process of claim 9 wherein the amount of phosphoric acid added is insufficient to cause fusion during said calcination.

* * * * *